United States Patent
Hasushita et al.

[11] Patent Number: 6,091,545
[45] Date of Patent: Jul. 18, 2000

[54] REAL IMAGE FINDER OPTICAL SYSTEM HAVING HALF MIRROR AND INFORMATION DISPLAY SURFACE WITHIN EYEPIECE OPTICAL SYSTEM

[75] Inventors: Sachio Hasushita, Saitama-ken; Tetsuya Abe; Takaaki Yano, both of Hokkaido, all of Japan

[73] Assignee: Asahi Kogaku Kogyo Kabushiki Kaisha, Tokyo, Japan

[21] Appl. No.: 09/120,374

[22] Filed: Jul. 22, 1998

[30] Foreign Application Priority Data

Jul. 22, 1997 [JP] Japan ................................. 9-211369

[51] Int. Cl.⁷ ............................ G02B 27/10; G02B 27/14
[52] U.S. Cl. .......................... 359/618; 359/629; 396/385
[58] Field of Search ......................... 359/618, 629–631, 359/726–728, 730, 364–366, 420, 421, 431; 396/373, 383, 385, 386

[56] References Cited

U.S. PATENT DOCUMENTS

| | | | |
|---|---|---|---|
| 5,400,101 | 3/1995 | Yoneyama et al. | 396/379 |
| 5,410,430 | 4/1995 | Ito et al. | 359/422 |
| 5,550,674 | 8/1996 | Abe et al. | 359/431 |
| 5,721,638 | 2/1998 | Kim | 359/431 |

FOREIGN PATENT DOCUMENTS 9-113962   5/1997   Japan .

OTHER PUBLICATIONS

Copy of an English Language Translation of JP No. 9–113962.

*Primary Examiner*—Huy Mai
*Attorney, Agent, or Firm*—Greenblum & Bernstein, P.L.C.

[57] ABSTRACT

A real image type finder optical system is provided with an objective optical system having a positive power, an erecting optical system for erecting a real image formed by the objective optical system and an eyepiece optical system for observing the real image formed by the objective optical system and erected by the erecting optical system. An information display surface provided in the eyepiece optical system, the information display surface displaying information to be observed in a field of view of the finder optical system. A partial mirror surface is provided within the eyepiece optical system, on an object side with respect to the information display surface. The partial mirror surface allows a part of light incident from the object to pass therethrough, and reflects light incident from the information display surface towards the eye side.

15 Claims, 3 Drawing Sheets

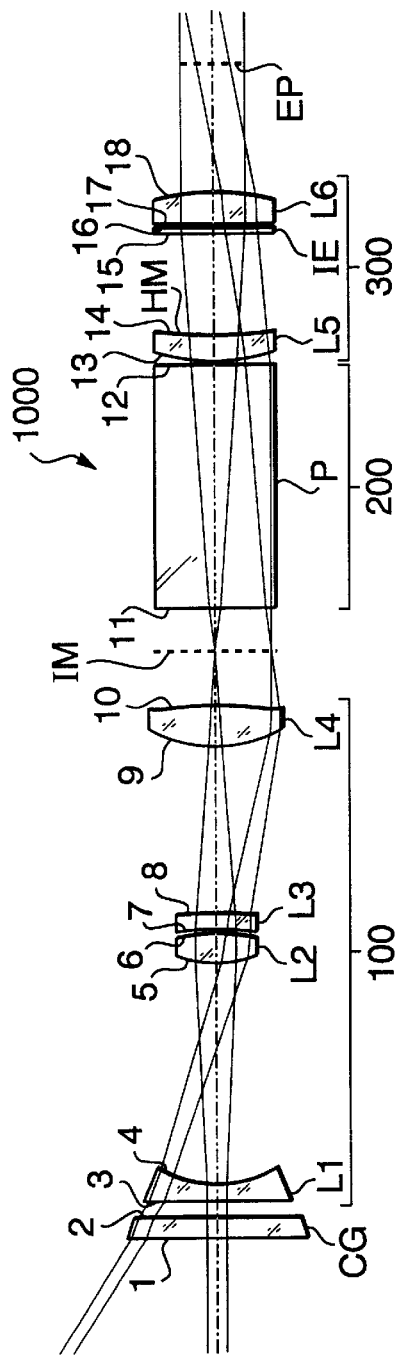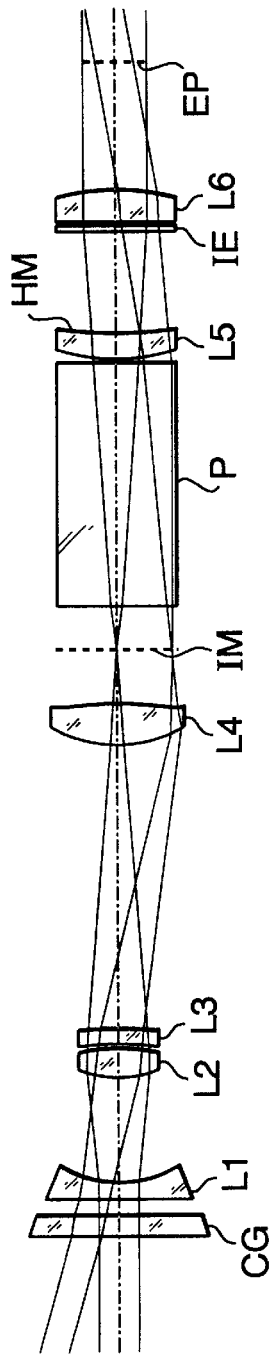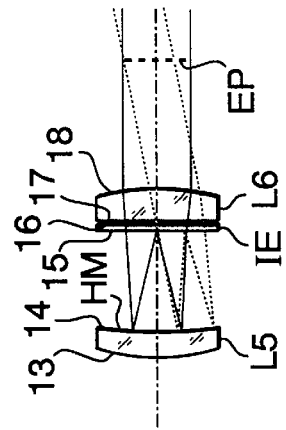

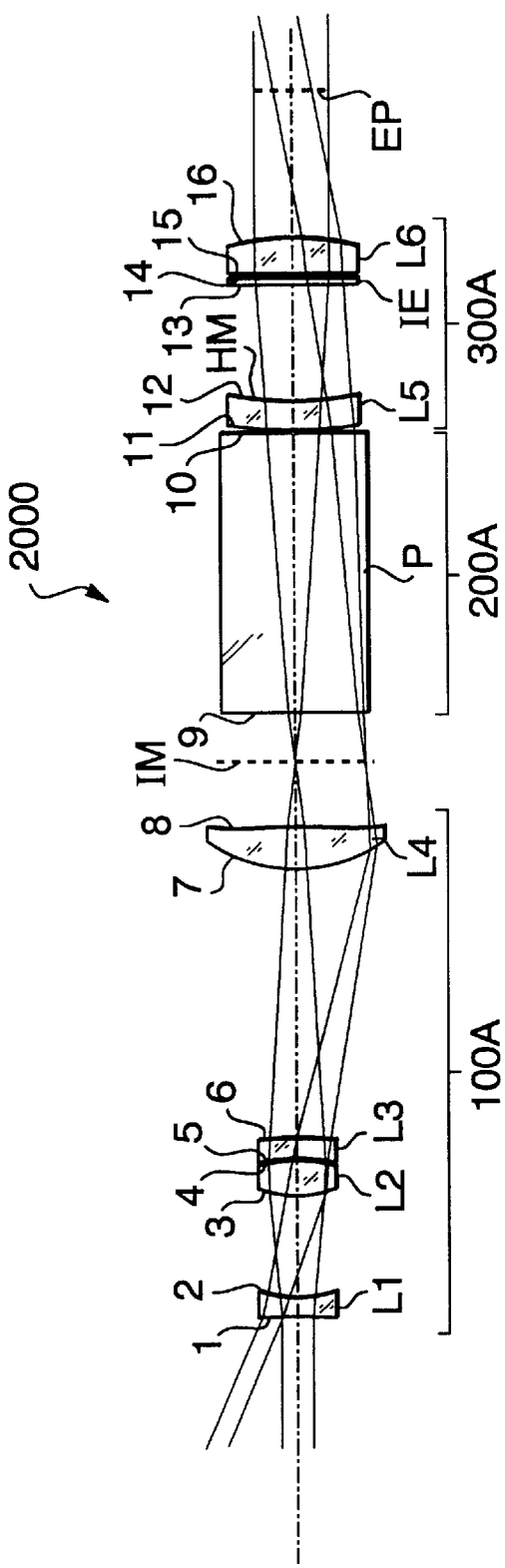
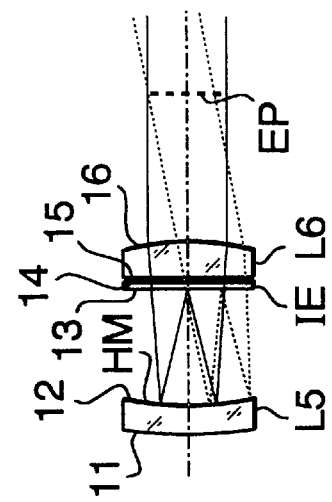
FIG. 2A
FIG. 2B

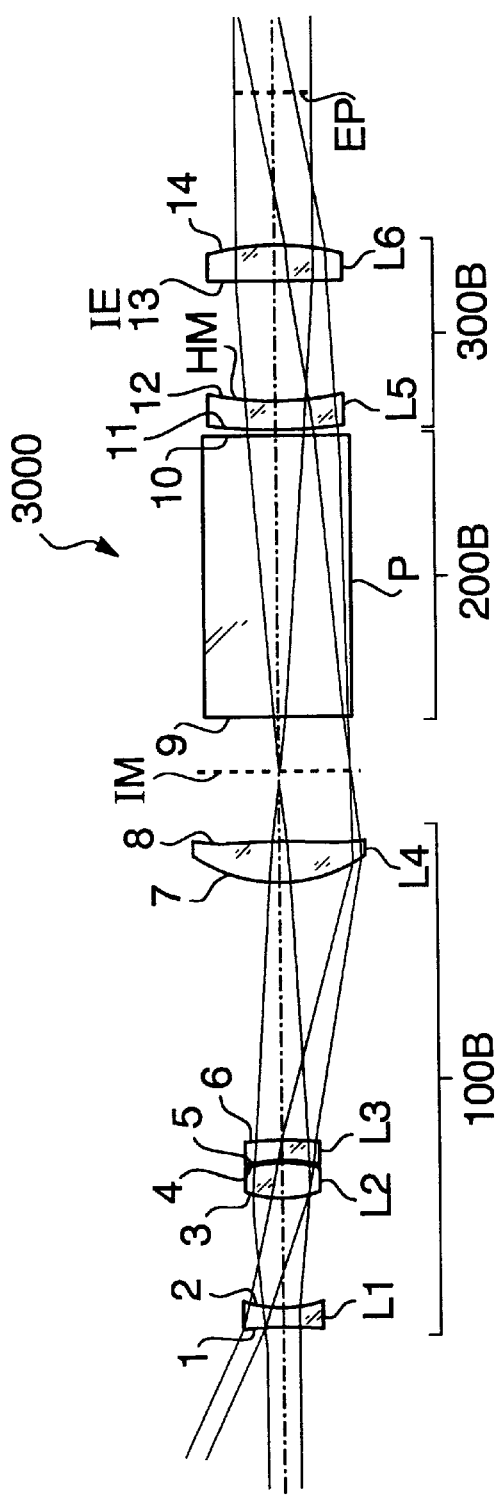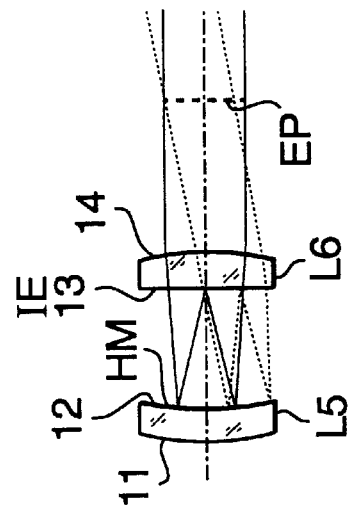
FIG. 3A
FIG. 3B

REAL IMAGE FINDER OPTICAL SYSTEM HAVING HALF MIRROR AND INFORMATION DISPLAY SURFACE WITHIN EYEPIECE OPTICAL SYSTEM

BACKGROUND OF THE INVENTION

The present invention relates to a real image type finder optical system provided, in a camera, independently of a photographing optical system, and more specifically, to a real image type finder optical system which is capable of displaying information in the field of view thereof.

A real image type finder is known as one of finders provided in a camera. The real image type finder may be provided independently of a photographing optical system. The real image type finder includes an objective optical system having a positive power, an erecting optical system for erecting a reversed image formed by the objective optical system, and an eyepiece optical system for observing the erected image in a magnified fashion. The above described optical systems are provided in this order from an object side.

In general, the real image type finder is provided with an information displaying element in the vicinity of an image plane of the objective optical system to display information in the finder field. The displaying element is arranged such that an opaque pattern is formed on a portion of a transparent member to thereby shield light which is incident from an object so that a frame indicating a photographing range, a frame indicating a focusing zone, a photographing mode of the camera, and other alphanumeric information are displayed in the finder field. If the information is variable, a liquid crystal display element or the like may be used.

In the above-described conventional real image type finder, however, since the display element is disposed in the vicinity of the focusing surface of the objective optical system on which the eye of a viewer is focused, there is a problem that when foreign particles such as dust particles are adhered on the displaying element while it is assembled into the camera, the foreign particles may be made conspicuous in a field of view when observed through the eyepiece optical system. If the number of surfaces arranged in the vicinity of the image plane is reduced, the possibility that the foreign particles are made conspicuous in the field of view is reduced. For this purpose, there has been known an arrangement that the lens of the objective optical system is spaced from the vicinity of the image plane. However, since conventional finders are designed such that the patterns formed on a displaying element are directly observed through the eyepiece optical system, the displaying element cannot be positioned apart from the vicinity of the image plane for the clear observation of the patterns. Thus, there still remains a problem that the foreign particles are conspicuous in the field of view and prevent observation.

SUMMARY OF THE INVENTION

It is therefore an object of the present invention to provide an improved real image type finder optical system which prevents foreign particles from being made conspicuous in a field of view even if they are adhered on the elements, including a displaying element, constituting an objective optical system.

For the above object, according to the invention, there is provided a real image type finder optical system, which is provided with an objective optical system having a positive power; an erecting optical system for erecting a reversed real image formed by the objective optical system; an eyepiece optical system for observing the real image formed by the objective optical system and erected by the erecting optical system, said eyepiece optical system being viewed from an eye side; an information display surface provided in the eyepiece optical system, the information display surface displaying information to be observed in a field of view of the finder optical system; and a partial mirror surface provided, within the eyepiece optical system, on an object side with respect to the information display surface, the partial mirror surface allowing a part of light incident from the object to pass therethrough and reflecting light incident from the information display surface towards said eye side.

In particular, surfaces of elements constituting the objective optical system and the erecting optical system are located apart from an image plane of the objective optical system.

Specifically, the partial mirror surface is formed on a surface of a lens included in the eyepiece optical system, the surface being one of a convex surface on the object side surface of the lens and a concave surface on the eye side surface of the lens.

In particular, the partial mirror surface comprises a half mirror surface. In this case, the half mirror surface may be formed on an entire area of the surface of the lens.

Preferably, the information display surface comprises a surface of a transparent member, and mirror finished reflection patterns are formed on the surface of the transparent member.

Optionally, the transparent member comprises a transparent plane-parallel plate.

Further optionally, light incident from the object and reflected by the mirror finished reflection patterns is reflected by the partial mirror surface and forms a virtual image.

It is preferable that the virtual image is formed in the vicinity of the image plane of the objective optical system.

Alternatively, the information display surface is formed on a surface of a lens included in the eyepiece optical system. Also in this case, mirror finished reflection patterns are formed on the surface of the lens.

It is preferable that, in the real image type finder optical system, the information display surface and the eyepiece optical system are arranged to satisfy a condition:

$0 \leq L/fe \leq 0.2$, wherein, L represents a distance in air between the information displaying surface and an eye side surface of the eyepiece optical system, and fe represents a focal length of the eyepiece optical system.

BRIEF DESCRIPTION OF THE ACCOMPANYING DRAWINGS

FIG. 1A shows an arrangement of optical elements of a finder optical system according to a first embodiment for a wide extremity;

FIG. 1B shows the arrangement, according to the first embodiment, for a tele extremity;

FIG. 1C shows an information displaying optical system according to the first embodiment;

FIG. 2A shows an arrangement of optical elements of a finder optical system according to a second embodiment;

FIG. 2B shows an information displaying optical system according to the second embodiment;

FIG. 3A shows an arrangement of optical elements of a finder optical system according to a third embodiment; and FIG. 3B shows an information displaying optical system according to the third embodiment.

DETAILED DESCRIPTION OF THE PREFERRED EMBODIMENTS

Embodiments of a real image type finder optical system according to embodiments of the present invention will be described hereinafter.

FIGS. 1A–1C show an arrangement of optical elements of a real image type finder optical system 1000 according to a first embodiment of the invention. The real image type finder optical system 1000 includes a cover glass CG, a zoom type objective optical system 100 having a positive power as a whole, an erecting optical system 200 for erecting a reversed image formed by the objective optical system 100, and an eyepiece optical system 300 for magnifying the erected image. The cover glass CG, the objective optical system 100, the erecting optical system 200, and the eyepiece optical system 300 are arranged in this order from an object side which is on the left-hand side in FIG. 1A. The numerals 1–18 in FIG. 1A represent respective surfaces of the optical elements counted from the object side. FIG. 1A shows the arrangement for a wide extremity, and FIG. 1B shows the arrangement for a tele extremity.

The objective optical system 100 includes a negative meniscus first lens L1, a biconvex second lens L2, a negative meniscus third lens L3, and a biconvex fourth lens (condenser lens) L4 which are arranged in this order from the object side. IM denotes an image plane of the objective optical system 100.

The erecting optical system 200 includes a mirror (not shown) and a prism P such as a Dach prism. The mirror is disposed, although not shown, in the objective optical system 100, and the prism P is shown in a developed fashion.

The eyepiece optical system 300 includes a positive meniscus fifth lens L5, an information displaying element IE for displaying information in a field of view, and a biconvex sixth lens L6. EP denotes an eye point of the finder optical system 1000.

The information displaying element IE included in the eyepiece optical system 300 is a transparent flat plate having mirror-finished reflection patterns formed on the object side surface. The reflection patterns include a pattern for showing the frame of a field of view for indicating a photographing range, a pattern for showing the frame of a focusing zone indicating the range of an object to be focused by an automatic focusing mechanism and the like. The reflection patterns are formed by vapor deposited metal film or coating, which reflects light, onto the transparent plate.

The concave surface (surface No. 14: the eyepiece optical system side surface) of the fifth lens L5 which is located on the object side with respect to the information displaying element IE is formed to be a partial mirror surface which partly reflects light incident thereon. Specifically, in the finder optical system 1000 shown in FIGS. 1A–1C, the concave surface 14 is formed to be a half mirror surface HM to which a half mirror coat is applied onto the entire surface thereof. The half mirror coat is formed of a vapor deposited metal film or coating, such that a part of light is allowed to pass therethrough and the other part of the light is reflected thereby.

Alternatively, if, in the eyepiece optical system, there is a lens, whose object side surface is a convex surface, on the object side with respect to the information displaying element IE, the convex surface may be used as the half mirror surface.

The reflection patterns directly face the half mirror surface HM in the finder optical system 1000 shown in FIGS. 1A–1C. This structure is advantageous since it prevents drop of a reflection ratio and minimizes a ghost. However, the invention is not limited to such a structure, but another lens may be interposed between the information displaying element IE and the half mirror surface HM. If a lens is interposed between the information displaying element IE and the half mirror surface HM, aberrations of the optical system contributing to show the information in the finder field may be compensated with the lens interposed. It should be noted that the optical system contributing to show the information (i.e., an optical system from the surface of the information displaying element IE on which the reflection patterns are formed to the eye point EP via the half mirror surface HM: surface 14–18) will be referred to as an information displaying optical system in this specification.

The light incident on the objective optical system 100 from the object side forms an image of the object on the image plane IM, and is incident on the eyepiece optical system 300 through the prism P.

Light incident on an area other than an area where the reflection patterns are formed of the image displaying element IE via the fifth lens L5 of the eyepiece optical system 300 passes through the display member IE and is incident on the eye of a viewer through the sixth lens L6, as shown in FIGS. 1A and 1B.

Light incident on and reflected by the reflection patterns of the information displaying element IE is reflected by the half mirror surface HM of the fifth lens L5, forms a virtual image of the reflection patterns and is incident on the eye of the viewer through the information displaying element IE and the sixth lens L6, as shown in FIG. 1C. A ray of light indicated by a solid line in FIG. 1C is an axial ray and a ray shown by a broken line is a rim ray. A position of the virtual image of the reflection patterns approximately coincides with a position of the image plane IM at which the real image of the object is formed by the objective optical system 100 when the image plane IM is viewed through the eyepiece optical system 300. Therefore, the viewer can observe the real image of the object and the virtual image of the reflection patterns in a superimposed state.

The surfaces of elements of the objective optical system, the prism P constituting the erecting optical system, and the information displaying element IE are spaced from the image plane IM of the objective optical system 100. Therefore, even if foreign particles such as dust particles is adhered on the surfaces thereof, the eye of the viewer does not focus on the foreign particles. Accordingly, the image of the foreign particles is not conspicuous in the field of view.

If the foreign particles are adhered on the surface of the information displaying element IE where the reflection patterns are formed, the light reflected by the foreign particles is reflected by the half mirror surface HM and forms a virtual image. In such a case, however, since the reflection ratio of the foreign particles is generally very low as compared with the reflection ratio of the mirror finished reflection patterns, the image of the foreign particles is inconspicuous in the field of view.

If the reflection patterns are formed within a relatively narrow area with respect to the entire field of view, or if the patterns are formed in a partial area, for example, in an outer peripheral area of the field of view, the partial mirror surface may be constituted as an ordinary mirror surface having a reflectance ratio of about 90%, in place of the half mirror surface, and formed only on a portion necessary to reflect the light corresponding to the patterns. In this case, the image of the object will be formed by the light passed through an area of the lens where the mirror surface is not formed.

A numerical example applicable to the above-described first embodiment will be described below.

As described above, the half mirror surface HM is formed on the eyepiece optical system side surface (i.e., surface 14) of the fifth lens L5, and the reflection patterns are formed on the object side surface (i.e., surface 15) of the information displaying element IE as shown in FIGS. 1A–1C. In the first embodiment, the information displaying element IE is a transparent plane-parallel plate.

Specific numerical arrangement for the first embodiment is indicated in Table 1. In Table 1, d0 represents a distance from the object side surface (surface 1) of the first lens L1 to the object [unit: mm], ω represents an actual field of view (half an amount) [unit: degree], β represents an apparent field of view (half an amount) [unit: degree], γ represents a magnification of an entire finder optical system, M represents a magnification of the information displaying optical system (i.e., an optical systems constituted by surface 14–18), D1 represents diopter of the finder optical system [unit: Dptr], D2 represents diopter of the information displaying optical system [unit: Dptr], r represents a radius of curvature of the each lens [unit: mm], d represents a thickness of lenses or intervals between lenses [unit: mm], nd represents a refractive index of each lens with respect to d-line (588 nm) and υ represents the Abbe's number of each lens. In this embodiment, the magnification M is defined as 250/fr, fr being a focal length of the information displaying optical system.

The finder optical system 1000 includes a zoom type objective optical system 100 and some of the factors change in accordance with the zoom operation. In tables, such values of such factors are expressed such that values for the wide extremity are shown on the left-hand side of "-" and values for the tele extremity are shown on the right-hand side thereof.

In the first embodiment, surfaces 3 and 4 of the first lens L1, surface 5 of the second lens L2, surface 8 of the third lens L3, surface 10 of the fourth lens L4, surface 13 of the fifth lens L5, and surface 18 of the sixth lens L6 are formed to be rationally-symmetrical aspherical surfaces.

The aspherical surface will be expressed by the following formula (1) which represents a sag amount X(h) at a coordinate point on the aspherical surface whose height with respect to the optical axis is h. That is, a distance of the coordinate point on the aspherical surface from the tangential plane of the aspherical surface at a point where the optical axis intersects the aspherical surface is represented by X(h).

$$X(h)=ch^2/(1+(1-(1+K)c^2h^2)^{1/2})+A4h^4+A6h^6 \quad \ldots (1)$$

where, c represents the curvature (1/r) of the aspherical surface on the optical axis, K represents a conic coefficient, and A4 and A6 represent fourth-order and sixth-order aspherical surface coefficients, respectively.

The radius of curvature of the aspherical surface indicated in Table 1 is the radius on the optical axis. Table 2 indicates the conic coefficients and aspherical surface coefficients of the aspherical surfaces.

TABLE 1

| d0 = −2940.0 mm | ω = 31.7 - 16.0° | β = 10.4° |
| γ = 0.32 -- 0.61 | M = 20.0 | |
| D1 = −0.99 Dptr | D2 = −1.00 Dptr | |

| Surface No. | r | d | nd | ν |
|---|---|---|---|---|
| 1 | ∞ | 1.90 | 1.49176 | 57.3 |
| 2 | ∞ | 1.50 -- 1.91 | | |
| 3 | 66.90 | 1.50 | 1.49176 | 57.3 |
| 4 | 8.36 | 20.31 -- 9.06 | | |
| 5 | 13.04 | 2.80 | 1.49176 | 57.3 |
| 6 | −9.62 | 0.20 | | |
| 7 | −14.51 | 1.50 | 1.58547 | 29.8 |
| 8 | −45.93 | 14.68 -- 25.51 | | |
| 9 | 11.62 | 3.50 | 1.49176 | 57.3 |
| 10 | −40.42 | 9.23 | | |
| 11 | ∞ | 21.70 | 1.49176 | 57.3 |
| 12 | ∞ | 0.20 | | |
| 13 | 12.68 | 2.50 | 1.49176 | 57.3 |
| 14 | 25.71 | 9.00 | | |
| 15 | ∞ | 0.50 | 1.51633 | 64.1 |
| 16 | ∞ | 0.50 | | |
| 17 | 703.05 | 2.60 | 1.49176 | 57.3 |
| 18 | −21.96 | | | |

TABLE 2

| | Third surface | Fourth surface | Fifth surface |
|---|---|---|---|
| k | 0.000 | 0.000 | 0.000 |
| A4 | −3.084 × 10$^{-4}$ | −4.881 × 10$^{-4}$ | −2.013 × 10$^{-4}$ |
| A6 | 2.982 × 10$^{-6}$ | 2.188 × 10$^{-7}$ | 0.000 |

| | Eighth surface | Tenth surface | Thirteenth surface |
|---|---|---|---|
| k | 0.000 | 0.000 | 0.000 |
| A4 | 9.833 × 10$^{-5}$ | 2.969 × 10$^{-4}$ | −1.085 × 10$^{-4}$ |
| A6 | −3.877 × 10$^{-6}$ | 0.000 | 1.738 × 10$^{-7}$ |

| | Eighteenth surface |
|---|---|
| k | 0.000 |
| A4 | 1.082 × 10$^{-5}$ |
| A6 | 2.536 × 10$^{-7}$ |

Second Embodiment

FIGS. 2A and 2B show an arrangement of optical elements of a real image type finder optical system 2000 according to a second embodiment of the invention. The real image type finder optical system 2000 includes an objective optical system 100A having a positive power as a whole, an erecting optical system 200A for erecting a reversed image formed by the objective optical system 100A, and an eyepiece optical system 300A for magnifying the erected image. The objective optical system 100A, the erecting optical system 200A, and the eyepiece optical system 300A are arranged in this order from an object side which is on the left-hand side in FIG. 2A. The numerals 1–16 in FIG. 2A represent respective surfaces of the optical elements counted from the object side.

In the second embodiment, the half mirror surface HM is formed on the eyepiece optical system side surface (i.e., surface 12) of the fifth lens L5, and the reflection patterns are formed on the object side surface (i.e., surface 13) of the information displaying element IE as shown in FIG. 2A. Similar to the first embodiment, the information displaying element IE of the second embodiment is a transparent plane-parallel plate.

FIG. 2A shows light incident from the object, and FIG. 2B shows a light passage of an information displaying optical system.

A numerical example of the second embodiment is indicated in Table 3.

In the second embodiment, surface 1 of the first lens L1, surface 3 of the second lens L2, surface 6 of the third lens L3, surface 8 of the fourth lens L4, surface 11 of the fifth lens L5, and surface 16 of the sixth lens L6 are formed to be rationally-symmetrical aspherical surfaces. Table 4 indicates the conic coefficients and aspherical surface coefficients of these surfaces.

TABLE 3 d0 = −2940.0 mm  ω = 24.2°  β = 10.9°  γ = 0.42
M = −18.5  D1 = −1.00 Dptr  D2 = −1.06 Dptr

| Surface No. | r | d | nd | v |
|---|---|---|---|---|
| 1 | −21.13 | 1.50 | 1.49176 | 57.3 |
| 2 | 8.50 | 8.11 | | |
| 3 | 8.56 | 2.80 | 1.49176 | 57.3 |
| 4 | −9.50 | 0.20 | | |
| 5 | −10.60 | 1.50 | 1.58547 | 29.8 |
| 6 | −24.35 | 21.33 | | |
| 7 | 11.11 | 3.33 | 1.49176 | 57.3 |
| 8 | −48.32 | 9.23 | | |
| 9 | ∞ | 21.70 | 1.49176 | 57.3 |
| 10 | ∞ | 0.20 | | |
| 11 | 20.39 | 2.50 | 1.49176 | 57.3 |
| 12 | 30.03 | 9.00 | | |
| 13 | ∞ | 0.50 | 1.51633 | 64.1 |
| 14 | ∞ | 0.50 | | |
| 15 | 55.14 | 2.60 | 1.49176 | 57.3 |
| 16 | −24.40 | | | |

TABLE 4

| | First surface | Third surface | Sixth surface |
|---|---|---|---|
| k | 0.000 | 0.000 | 0.000 |
| A4 | $1.649 \times 10^{-4}$ | $1.977 \times 10^{-4}$ | $5.282 \times 10^{-4}$ |
| A6 | 0.000 | 0.000 | $1.106 \times 10^{-5}$ |
| | Eight surface | Eleventh surface | Sixteenth surface |
| k | 0.000 | 0.000 | 0.000 |
| A4 | $3.089 \times 10^{-4}$ | $-4.724 \times 10^{-5}$ | $7.604 \times 10^{-6}$ |
| A6 | $-9.560 \times 10^{-7}$ | 0.000 | $1.245 \times 10^{-7}$ |

Third Embodiment

FIGS. 3A and 3B show an arrangement of optical elements of a real image type finder optical system 3000 according to a third embodiment of the invention. The real image type finder optical system 3000 includes an objective optical system 100B having a positive power as a whole, an erecting optical system 200B for erecting a reversed image formed by the objective optical system 100B, and an eyepiece optical system 300B for magnifying the erected image. The objective optical system 100B, the erecting optical system 200B, and the eyepiece optical system 300B are arranged in this order from an object side which is on the left-hand side in FIG. 3A. The numerals 1–14 in FIG. 3A represent respective surfaces of the optical elements counted from the object side.

In the third embodiment, the half mirror surface HM is formed on the eyepiece optical system side surface (i.e., surface 12) of the fifth lens L5, and the reflection patterns are formed on the object side surface (i.e., surface 13) of the sixth lens L6.

FIG. 3A shows light incident from the object, and FIG. 3B shows a light passage of an information displaying optical system.

A numerical example of the third embodiment is indicated in Table 5.

In the third embodiment, surface 1 of the first lens L1, surface 3 of the second lens L2, surface 6 of the third lens L3, surface 8 of the fourth lens L4, surface 11 of the fifth lens L5, and surface 14 of the sixth lens L6 are formed to be rationally-symmetrical aspherical surfaces. Table 6 indicates the conic coefficients and aspherical surface coefficients of these surfaces.

TABLE 5 d0 = −2940.0 mm  ω = 24.2°  β = 10.9°  γ = 0.42
M = 19.2  D1 = −1.00 Dptr  D2 = −1.12 Dptr

| Surface No. | r | d | nd | v |
|---|---|---|---|---|
| 1 | −32.53 | 1.50 | 1.49176 | 57.3 |
| 2 | 7.50 | 8.33 | | |
| 3 | 8.79 | 2.80 | 1.49176 | 57.3 |
| 4 | −8.63 | 0.20 | | |
| 5 | −10.63 | 1.50 | 1.58547 | 29.8 |
| 6 | −28.44 | 20.05 | | |
| 7 | 11.27 | 3.37 | 1.49176 | 57.3 |
| 8 | −40.71 | 9.23 | | |
| 9 | ∞ | 21.70 | 1.49176 | 57.3 |
| 10 | ∞ | 0.20 | | |
| 11 | 17.16 | 2.50 | 1.49176 | 57.3 |
| 12 | 28.63 | 9.00 | | |
| 13 | ∞ | 2.60 | 1.49176 | 57.3 |
| 14 | −17.92 | | | |

TABLE 6

| | First surface | Third surface | Sixth surface |
|---|---|---|---|
| k | 0.000 | 0.000 | 0.000 |
| A4 | $9.285 \times 10^{-5}$ | $2.106 \times 10^{-4}$ | $5.266 \times 10^{-4}$ |
| A6 | 0.000 | 0.000 | $1.530 \times 10^{-5}$ |
| | Eight surface | Eleventh surface | Fourteenth surface |
| k | 0.000 | 0.000 | 0.000 |
| A4 | $3.137 \times 10^{-4}$ | $-5.216 \times 10^{-5}$ | $3.525 \times 10^{-5}$ |
| A6 | $-1.093 \times 10^{-6}$ | 0.000 | $-8.281 \times 10^{-8}$ |

As described above, according to the present invention, since the elements constituting the objective optical system and the erecting optical system are spaced from the image plane of the objective optical system, foreign particles adhered on the surfaces of the optical elements are inconspicuous in the field of view. Further, when the light reflected by the reflection patterns formed on a surface of an element of the eyepiece optical system is reflected by the half mirror surface and caused to be incident on the eye of the viewer, even if the foreign particles is adhered on reflection patterns and the light reflected by the foreign particles is reflected by the half mirror surface and forms the virtual image of the foreign particles, the virtual image of the foreign particles are inconspicuous in the field of view since the reflection ratio of the foreign particles is generally very low as compared with the reflection ratio of the mirror finished reflection patterns.

It is preferable that the finder optical system according to the present invention satisfies the following condition (2):

$$0 \leq L/fe \leq 0.2 \qquad \ldots (2),$$

where, L represent a distance in air between the information displaying surface and the eye side surface of the eyepiece optical system (i.e., surface 18 in the first embodiment; surface 16 in the second embodiment; surface 14 in the third embodiment), and fe represents a focal length of the eyepiece optical system. Values of L, fe, and L/fe are indicated in Table 7 below.

TABLE 7

|  | 1st embodiment | 2nd embodiment | 3rd embodiment |
|---|---|---|---|
| L | 2.6 | 2.6 | 1.7 |
| fe | 27.1 | 30.0 | 28.7 |
| L/fe | 0.095 | 0.085 | 0.059 |

If L/fe=0, the information displaying surface coincides with the eye side surface of the eyepiece optical system. Accordingly, if L/fe is less than 0 (zero), the information display surface IE may be touched by a user, and may easily be deteriorated. If L/fe is greater than 0.2, the patterns formed on the information displaying surface may be directly viewed by the viewer. In such a case, the directly viewed patterns are recognized as darkened portions in the finder field. If the finder optical system is constituted to satisfy the above condition (2), such a problem can be avoided.

The present disclosure relates to a subject matter contained in Japanese Patent Application No. HEI 09-211369, filed on Jul. 22, 1997, which is expressly incorporated herein by reference in its entirety.

What is claimed is:

1. A real image finder optical system, comprising:
   an objective optical system having a positive power and forming a real image of an object;
   an erecting optical system for erecting the real image formed by the objective optical system;
   an eyepiece optical system for observing said real image formed by said objective optical system and erected by said erecting optical system, said eyepiece optical system being viewed from an eye side;
   an information display surface provided in said eyepiece optical system, said information display surface displaying information to be observed in a field of view of said finder optical system; and
   a partial mirror surface provided, within said eyepiece optical system, on an object side with respect to said information display surface, said partial mirror surface allowing a part of light incident thereon from said object side to pass therethrough and reflecting light incident thereon from said information display surface towards said eye side.

2. The real image finder optical system according to claim 1, wherein surfaces of elements constituting said objective optical system and said erecting optical system are spaced from an image plane of said objective optical system.

3. The real image finder optical system according to claim 1, wherein said partial mirror surface is formed on a surface of a lens included in said eyepiece optical system, said surface being one of a convex surface on the object side surface of said lens and a concave surface on said eye side surface of said lens.

4. The real image finder optical system according to claim 3, wherein said partial mirror surface comprises a half mirror surface.

5. The real image finder optical system according to claim 4, wherein said half mirror surface is formed on an entire area of said surface of said lens.

6. The real image finder optical system according to claim 1, wherein said information display surface comprises a surface of a transparent member, mirror finished reflection patterns being formed on said surface of said transparent member.

7. The real image finder optical system according to claim 6, wherein said transparent member comprises a transparent plane-parallel plate.

8. The real image finder optical system according to claim 6, wherein light incident onto said transparent member from said object side and reflected by said mirror finished reflection patterns is reflected by said partial mirror surface and forms a virtual image.

9. The real image finder optical system according to claim 8, wherein said virtual image of said reflection patterns is formed in the vicinity of said image plane of said objective optical system.

10. The real image finder optical system according to claim 1, wherein said information display surface is formed on a surface of a lens included in said eyepiece optical system.

11. The real image finder optical system according to claim 10, wherein mirror finished reflection patterns are formed on said surface of said lens included in said eyepiece optical system.

12. The real image finder optical system according to claim 1, wherein said information display surface and said eyepiece optical system are arranged to satisfy a condition:
$0 \leq L/fe \leq 0.2$,
wherein, L represents a distance in air between said information displaying surface and an eye side surface of said eyepiece optical system, and fe represents a focal length of said eyepiece optical system.

13. A real image finder optical system, comprising:
   an objective optical system having a positive power and forming a real image of an object;
   an erecting optical system that erects the real image formed by the objective optical system;
   an eyepiece optical system for observing the real image formed by said objective optical system and erected by said erecting optical system, said eyepiece optical system being viewed from an observer side;
   an information display surface formed in said eyepiece optical system, said information display surface displaying information to be observed in a field of view of said finder optical system; and
   a partial mirror surface positioned within said eyepiece optical system, on an object side with respect to said information display surface, said partial mirror surface allowing a portion of light incident onto said partial mirror surface from said erecting optical system to pass through said partial mirror surface and through said eyepiece optical system, said partial mirror surface receiving light reflected from said information display surface towards said partial mirror surface and reflecting said reflected light back towards said information display surface.

14. The real image finder optical system according to claim 13, said information display surface and said eyepiece optical system being positioned to satisfy the relationship:
$0 \leq L/fe \leq 0.2$,
where L represents a distance in air between said information display surface and an observer side surface of said eyepiece optical system, and fe represents a focal length of said eyepiece optical system.

15. The real image finder according to claim 13, said information display surface and said partial mirror surface comprising a reflecting optical system within said eyepiece optical system.

* * * * *